US012722466B2

(12) United States Patent
Sakai

(10) Patent No.: US 12,722,466 B2
(45) Date of Patent: Sep. 1, 2026

(54) ELECTRIC VEHICLE

(71) Applicant: TOYOTA JIDOSHA KABUSHIKI KAISHA, Toyota (JP)

(72) Inventor: Kazunori Sakai, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 244 days.

(21) Appl. No.: 18/739,661

(22) Filed: Jun. 11, 2024

(65) Prior Publication Data

US 2025/0033450 A1 Jan. 30, 2025

(30) Foreign Application Priority Data

Jul. 25, 2023 (JP) ................................ 2023-121148

(51) Int. Cl.

| | |
|---|---|
| ***B60K 1/02*** | (2006.01) |
| ***B60K 17/16*** | (2006.01) |
| ***F16H 1/20*** | (2006.01) |
| ***H02K 5/173*** | (2006.01) |
| *F16H 1/08* | (2006.01) |
| *H02K 5/24* | (2006.01) |
| *H02K 7/116* | (2006.01) |

(52) U.S. Cl.

CPC .............. *B60K 1/02* (2013.01); *B60K 17/165* (2013.01); *H02K 5/1732* (2013.01); *F16H 1/08* (2013.01); *F16H 1/20* (2013.01); *H02K 5/24* (2013.01); *H02K 7/116* (2013.01)

(58) Field of Classification Search

CPC .. B60K 1/02; B60K 17/165; B60K 6/42–547; H02K 5/1732; H02K 5/24; H02K 7/116; F16H 1/08; F16H 1/20; F16H 57/021–2057/0228

See application file for complete search history.

(56) References Cited

U.S. PATENT DOCUMENTS

2001/0050190 A1* 12/2001 Takenaka ................. B60K 6/36 903/910
2004/0130224 A1 7/2004 Mogi et al.
2015/0024902 A1* 1/2015 Hori ......................... B60K 6/42 903/952
2017/0113535 A1* 4/2017 Hirano ................ F16H 37/0806
2019/0249765 A1* 8/2019 Ito ............................ B60K 1/00
2021/0252962 A1 8/2021 Yano et al.

FOREIGN PATENT DOCUMENTS

JP 2004-175261 A 6/2004
JP 2021-132435 9/2021

* cited by examiner

*Primary Examiner* — Tinh T Dang

(74) *Attorney, Agent, or Firm* — Oblon, McClelland, Maier & Neustadt, L.L.P.

(57) ABSTRACT

An electric vehicle in which a gear shaft provided with a helical gear is held by a first casing member through a first bearing. The gear shaft has a splined outer circumferential surface fitted in a splined inner circumferential surface of a rotor shaft that is held by a second casing member through a second bearing and is held by a third casing member through a third bearing. The gear shaft includes a large diameter portion which has a diameter larger than a diameter of the splined outer circumferential surface, and the large diameter portion is in contact, at its end surface, with an end surface of an inner race of the second bearing. The rotor shaft includes a stepped portion that is spaced apart from the third bearing by a clearance that is larger than an internal clearance of the second bearing.

3 Claims, 3 Drawing Sheets

COMPARATIVE EXAMPLE

COMPARATIVE EXAMPLE

EMBODIMENT OF INVENTION

EMBODIMENT OF INVENTION

EMBODIMENT OF INVENTION

ELECTRIC VEHICLE

This application claims priority from Japanese Patent Application No. 2023-121148 filed on Jul. 25, 2023, the disclosure of which is herein incorporated by reference in its entirety.

FIELD OF THE INVENTION

The present invention relates to an electric vehicle in which an electric motor and one of helical gears are provided on the same rotation axis.

BACKGROUND OF THE INVENTION

An electric vehicle is well known which includes: (a) an electric motor having a rotor shaft; (b) helical gears including (b-1) a first gear disposed on a rotation axis of the electric motor and (b-2) a second gear disposed on another rotation axis that is parallel to the rotation axis of the electric motor, such that the first and second gears mesh with each other; (c) a gear shaft on which the first gear is fixed in a relatively non-rotatable manner, such that the gear shaft has, in a motor-side portion thereof located on a side of the electric motor, a splined outer circumferential surface that is fitted in a splined inner circumferential surface of a first-gear-side portion of the rotor shaft located on a side of the first gear; (d) a casing including a first casing member and a second casing member, such that the first casing member and the second casing member are fixed to each other to form a gear room that houses the helical gears, and such that the second casing member forms a motor room that houses the electric motor; (e) a first bearing through which an end portion of the gear shaft is rotatably held by the first casing member, the end portion of the gear shaft being opposite to the electric motor; and (f) a second bearing through which an end portion of the rotor shaft is rotatably held by the second casing member, the end portion of the rotor shaft being included in the first-gear-side portion. For example, an electric vehicle disclosed in Patent Document 1 is such an electric vehicle. In the electric vehicle disclosed in Patent Document 1, a thrust force generated in a gear shaft by a gear meshing reaction force in the helical gears and acting in a direction toward the electric motor is caused to act on an inner race of the second bearing, and the thrust force caused to act on the inner race of the second bearing is caused to act on the second casing member through an outer race of the second bearing.

PRIOR ART DOCUMENT

Patent Document

[Patent Document 1]
Japanese Patent Application Laid-Open No. 2004-175261

SUMMARY OF THE INVENTION

Here, there is a case where a third casing member that forms the motor room by being fixed to the second casing member is provided, and the rotor shaft is rotatably held by the third casing member through a third bearing at an end portion of the rotor shaft that is opposite to the first gear. In this case, for example, the thrust force transmitted from the gear shaft directly or indirectly through the second bearing to the rotor shaft may be transmitted to the third casing member through the third bearing. Then, the rotor shaft hits the third casing member through the third bearing due to the thrust force, and thus a so-called "NV" may be increased. The "NV" is a general term meaning noise and vibration generated in the vehicle, and represents at least one of noise and vibration in the vehicle.

The present invention has been made in view of the background art described above, and an object of the present invention is to provide an electric vehicle capable of suppressing NV.

The present invention provides an electric vehicle including: (a) an electric motor having a rotor shaft; (b) helical gears including a first gear disposed on a rotation axis of the electric motor and a second gear disposed on another rotation axis that is parallel to the rotation axis of the electric motor, such that the first and second gears mesh with each other; (c) a gear shaft on which the first gear is fixed in a relatively non-rotatable manner, such that the gear shaft has, in a motor-side portion thereof located on a side of the electric motor, a splined outer circumferential surface that is fitted in a splined inner circumferential surface of a first-gear-side portion of the rotor shaft located on a side of the first gear; (d) a casing including a first casing member, a second casing member and a third casing member, such that the first casing member and the second casing member are fixed to each other to form a gear room that houses the helical gears, and such that the second casing member and the third casing member are fixed to each other to form a motor room that houses the electric motor; (e) a first bearing through which an end portion of the gear shaft is rotatably held by the first casing member, the end portion of the gear shaft being opposite to the electric motor; (f) a second bearing through which an end portion of the rotor shaft is rotatably held by the second casing member, the end portion of the rotor shaft being included in the first-gear-side portion of the rotor shaft; and (g) a third bearing through which another end portion of the rotor shaft is rotatably held by the third casing member, the another end portion of the rotor shaft being opposite to the first gear. The gear shaft includes a large diameter portion which is located between the motor-side portion and the first gear and which has a diameter larger than a diameter of the splined outer circumferential surface. The rotor shaft includes a stepped portion which is located adjacent to the another end portion of the rotor shaft and which has a diameter larger than a diameter of the another end portion of the rotor shaft. The large diameter portion of the gear shaft is in contact, at an end surface thereof located on the side of the electric motor, with an end surface of an inner race of the second bearing located on a side of the first gear. The stepped portion has an end surface opposed to the third bearing, the end surface of the stepped portion being spaced apart from an end surface of the third bearing opposed to the end surface of the stepped portion, by a clearance that is larger than an internal clearance of the second bearing. For example, the end portion of the rotor shaft, which is included in the first-gear-side portion of the rotor shaft, has an end surface that is opposed to the end surface of the large diameter portion of the gear shaft, such that the end surface of the end portion of the rotor shaft is spaced apart from the end surface of the large diameter portion of the gear shaft. Further, for example, the third casing member, by which the another end portion of the rotor shaft is rotatably held through the third bearing, constitutes an outermost surface of the casing.

In the electric vehicle according to the invention, the gear shaft includes the large diameter portion which is located between the motor-side portion and the first gear and which has the diameter larger than the diameter of the splined outer circumferential surface, and the large diameter portion of the gear shaft is in contact, at the end surface thereof located on the side of the electric motor, with the end surface of the inner race of the second bearing located on the side of the first gear. In addition, the stepped portion has the end surface opposed to the third bearing, and the end surface of the stepped portion is spaced apart from the end surface of the third bearing opposed to the end surface of the stepped portion, by the clearance that is larger than the internal clearance of the second bearing. Thus, when a thrust force acting on the gear shaft in a direction toward the electric motor is generated by a gear meshing reaction force in the helical gears, the thrust force is applied to the inner race of the second bearing. In this instance, the internal clearance of the second bearing, i.e., a play or backlash between the inner race and an outer race of the second bearing is reduced before the clearance between the end surface of the stepped portion and the end surface of the third bearing is reduced. Therefore, the thrust force acting on the gear shaft in the direction toward the electric motor is transmitted to the second casing member through the second bearing, and is received by the second casing member, without easily being transmitted to the third casing member, so that the third casing member is not easily made to serve as a noise generating portion. Since the second casing member is located between the gear room and the motor room, even if the thrust force is transmitted to the second casing member, a noise radiated to outside of the casing is suppressed. Therefore, the NV can be suppressed.

DETAILED DESCRIPTION OF PREFERRED EMBODIMENT

Hereinafter, an embodiment of the present invention will be described in detail with reference to the drawings.

Embodiment

Figure 1:
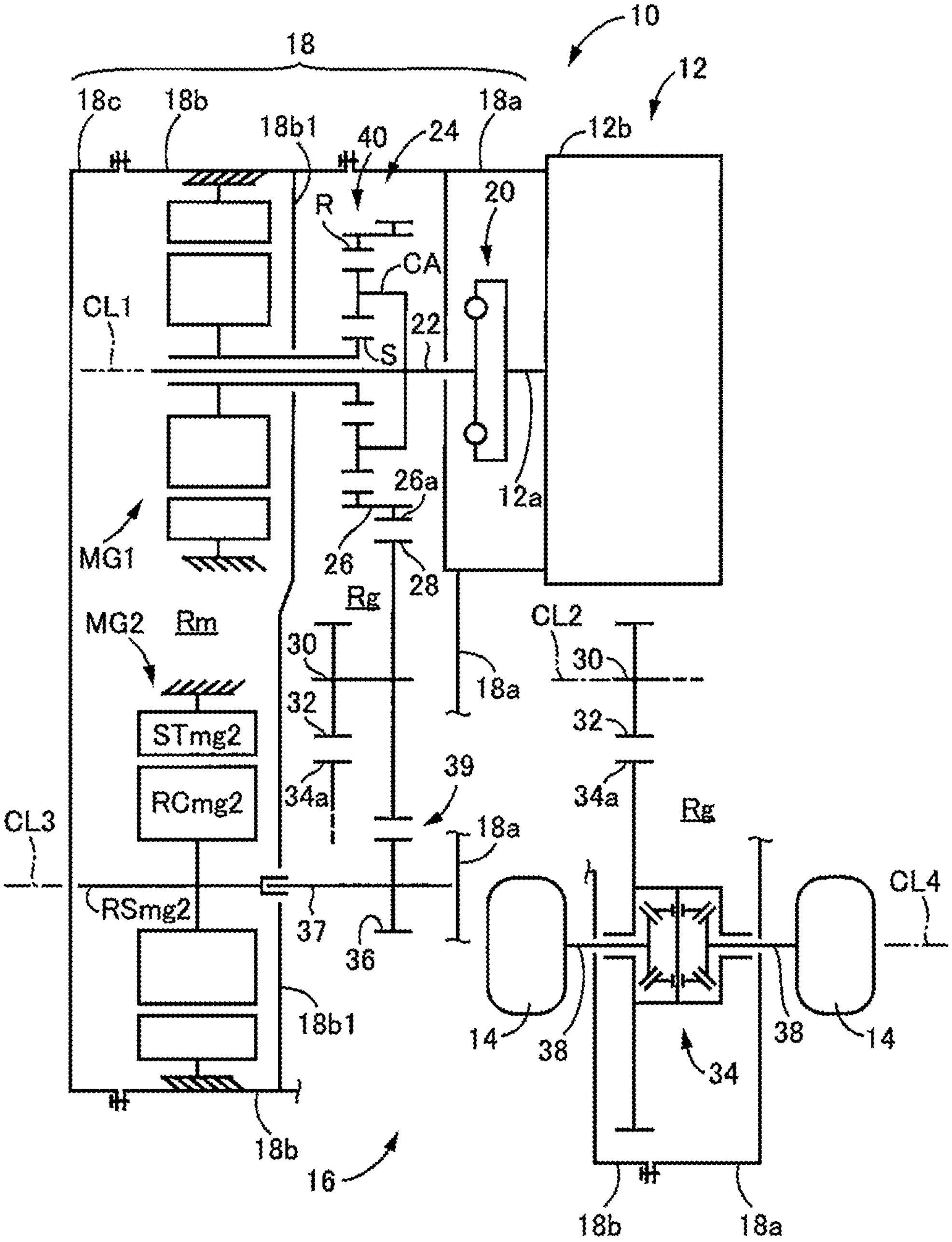
FIG. 1 is a view schematically showing, by way of example, a construction of an electric vehicle to which the present invention is applied.

FIG. 1 is a view schematically showing, by way of example, a construction of an electric vehicle 10 to which the present invention is applied. The electric vehicle 10 shown in FIG. 1 is a hybrid electric vehicle including an engine 12, a first electric motor MG1 and a second electric motor MG2. The electric vehicle 10 (hereinafter referred to as "vehicle 10") further includes drive wheels 14 and a power transmission device 16. The power transmission device 16 is provided in a power transmission path between the engine 12 and the drive wheels 14 and in a power transmission path between the second electric motor MG2 and the drive wheels 14.

Each of the first electric motor MG1 and the second electric motor MG2 is a known rotary electric machine, i.e., a so-called motor generator, and is provided in a non-rotatable casing 18 that is a non-rotating member attached to a body of the vehicle 10.

The power transmission device 16 includes a damper 20, an input shaft 22, a transmission portion 24, a composite gear 26, a driven gear 28, a driven shaft 30, a final gear 32, a differential gear device 34, a reduction gear 36 and a reduction shaft 37 that are disposed in the casing 18. The power transmission device 16 includes a pair of drive shafts 38 connected to the differential gear device 34.

The damper 20 is connected to a crankshaft 12*a* of the engine 12. The input shaft 22 functions as an input rotary member of the transmission portion 24. The input shaft 22 is connected to the damper 20, and is connected to the crankshaft 12*a* through the damper 20 and the like. The transmission portion 24 is connected to the input shaft 22. The composite gear 26 is a rotating body on an output side of the transmission portion 24. The composite gear 26 has a drive gear 26*a* provided in a part of an outer circumferential surface thereof. The drive gear 26*a* is an output-side rotary member of the transmission portion 24. The driven gear 28 meshes with the drive gear 26*a*. The driven gear 28 and the final gear 32 are fixed to the driven shaft 30 so as not to be rotatable relative to the drive shaft 30. The final gear 32 has a smaller diameter than the driven gear 28, and meshes with a differential ring gear 34*a*. The reduction gear 36 has a smaller diameter than the driven gear 28, and meshes with the driven gear 28. The reduction shaft 37 is a gear shaft on which the reduction gear 36 is fixed so as not to be rotatable relative to the reduction shaft 37.

The second electric motor MG2 is an electric motor having a stator STmg2, a rotor core RCmg2 and a rotor shaft RSmg2. The rotor shaft RSmg2 is a rotor shaft of the second electric motor MG2. The rotor shaft RSmg2 is a hollow shaft that is connected to an inner circumferential surface of the rotor core RCmg2 so as not to be rotatable relative to the rotor core RCmg2, and is connected to the reduction shaft 37 by spline fitting. The reduction shaft 37 has a splined outer circumferential surface in a motor-side portion thereof located on a side of the second electric motor MG2, and the splined outer circumferential surface of the reduction shaft 37 is fitted in a splined inner circumferential surface of a first-gear-side portion of the rotor shaft RSmg2 located on a side of the reduction gear 36 (see FIG. 3A and FIG. 3C). That is, the reduction shaft 37 and the rotor shaft RSmg2 are fixed to each other by spline fitting. The second electric motor MG2 is connected to the reduction gear 36 in a power transmittable manner.

The transmission portion 24 includes the above-described first electric motor MG1 and a differential mechanism 40. The differential mechanism 40 is a known single-pinion planetary gear device including a sun gear S, a carrier CA and a ring gear R. The sun gear S is connected to the first electric motor MG1 in a power transmittable manner. The carrier CA is connected to the engine 12 through the input shaft 22 and the like in a power transmittable manner. The ring gear R is provided in a part of an inner circumferential surface of the composite gear 26, and is integrally connected to the drive gear 26*a*. The power split mechanism 40 mechanically splits a power of the engine 12, which is inputted to the carrier CA, to the first electric motor MG1 and the drive gear 26*a*. The transmission portion 24 is a known electric transmission mechanism.

The power transmission device 16 has a first axis CL1, a second axis CL2, a third axis CL3 and a fourth axis CLA. These four axes CL1, CL2, CL3, CL4 are parallel to one another. The first axis CL1 is a rotation axis of the input shaft 22, the transmission portion 24 and the first electric motor MG1. The second axis CL2 is a rotation axis of the driven gear 28, the driven shaft 30 and the final gear 32. The third axis CL3 is a rotation axis of the reduction gear 36 and the second electric motor MG2. The fourth axis CL4 is a rotation axis of the differential gear device 34 and the drive shaft 38.

The casing 18 includes a housing 18*a* as a first casing member, a main body 18*b* as a second casing member and a cover 18*c* as a third casing member. The housing 18*a* has an opening portion opposed to the engine 12, and an engine block 12*b* of the engine 12 is connected to the opening portion of the housing 18*a*. The housing 18*a* and the main body 18*b* are integrally connected to each other by fasteners such as bolts, such that another opening portion of the housing 18*a* remote from the engine 12 and an opening portion of the main body 18*b* opposed to the housing 18*a* are aligned with each other. The main body 18*b* and the cover 18*c* are integrally connected to each other by fasteners such that the cover 18*c* closes another opening portion of the main body 18*b* which is remote from the engine 12.

The main body 18*b* is a casing member having a partition wall 18*b*1 that separates a gear room Rg that houses the differential gear device 34, the helical gears 39, the differential mechanism 40, etc., from a motor room Rm that houses the first electric motor MG1 and the second electric motor MG2. The helical gears 39 are a pair of gears constituted by the above-described reduction gear 36 and driven gear 28 that mesh with each other. The reduction gear 36 serves as a first gear disposed on the third axis CL3. The driven gear 28 serves as a second gear disposed on the second axis CL2 as another rotation axis parallel to the third axis CL3. In the casing 18, the gear room Rg is formed by fixing the housing 18*a* and the main body 18*b* to each other, and the motor room Rm is formed by fixing the main body 18*b* and the cover 18*c* to each other.

The vehicle 10 includes a power control unit (not shown), and the first electric motor MG1, the second electric motor MG2 and the like are controlled by the power control unit.

Figure 2A:
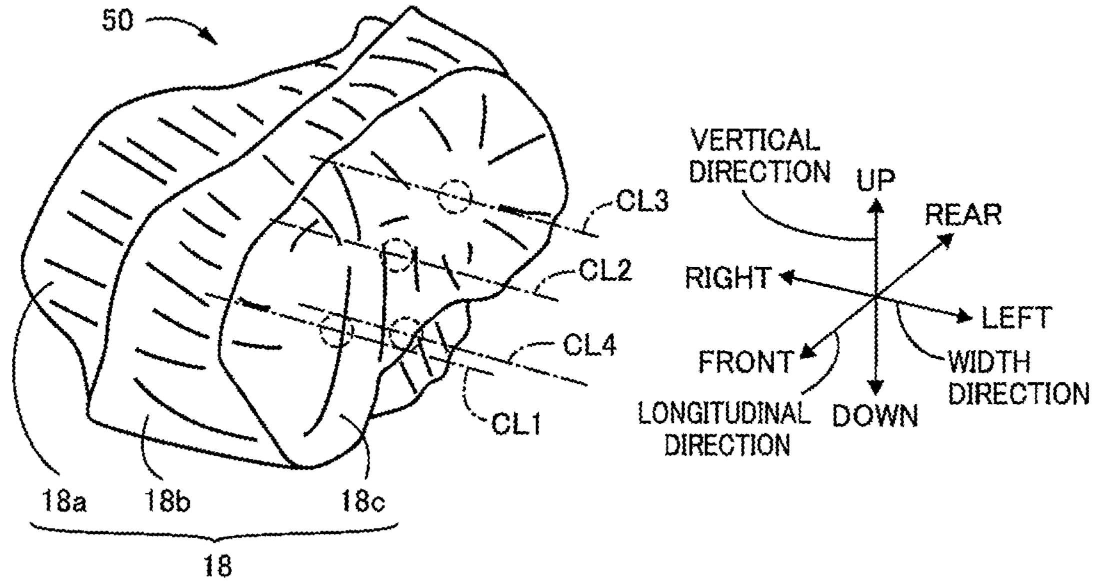
FIG. 2A is a view for explaining an example of a construction of a drive device of the electric vehicle, wherein the view is a perspective view as viewed from a front left side of the electric vehicle.
Figure 2B:
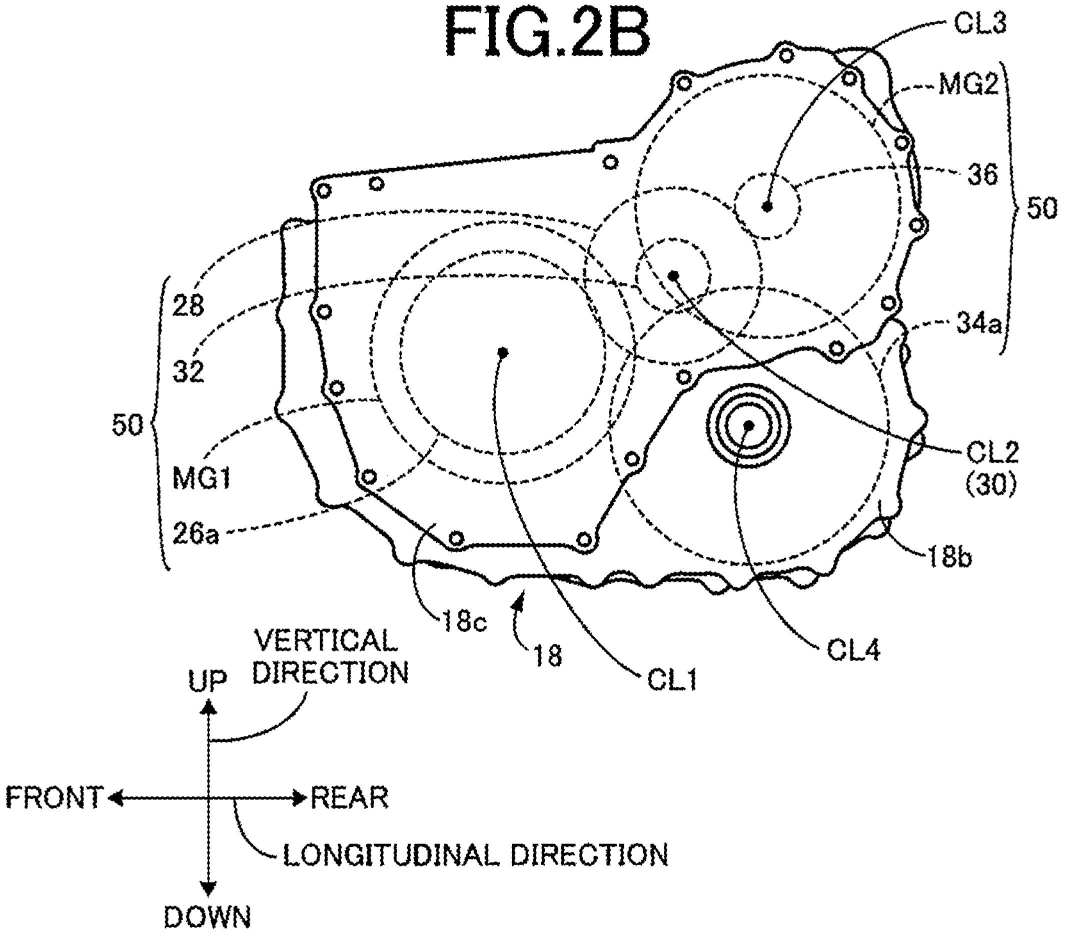
FIG. 2B is a view for explaining the example of the construction of the drive device, wherein the view is a side view as viewed from a left side of the electric vehicle.

FIG. 2A and FIG. 2B are views for explaining an example of a construction of a transaxle 50 of the vehicle 10, wherein the view of FIG. 2A is a perspective view as viewed from a front left side of the vehicle 10, and the view of FIG. 2B is a side view as viewed from a left side of the vehicle 10. As shown in FIGS. 2A and 2B, the transaxle 50 is housed in the casing 18. The transaxle 50 is a drive device including the power transmission device 16 (26*a*, 28, 32, 34*a*, 36, etc.), the first electric motor MG1 and the second electric motor MG2. In FIGS. 2A and 2B, "VERTICAL DIRECTION", "LONGITUDINAL DIRECTION" and "WIDTH DIRECTION" represents a vertical direction, a longitudinal direction and a width direction of the vehicle 10, respectively. The width direction of the vehicle 10 is a horizontal direction which is perpendicular to the longitudinal direction of the vehicle 10 and which is parallel to the above-described first axis CL1, second axis CL2, third axis CL3 and fourth axis CL4.

When the transaxle 50 is installed in the vehicle 10, the four axes CL1, CL2, CL3, CL4 are parallel to the width direction of the vehicle 10. Further, when the transaxle 50 is installed in the vehicle 10, the four axes CL1, CL2, CL3, CL4 are arranged, such that the second electric motor MG2, the driven shaft 30, the first electric motor MG1 and the differential gear device 34 are arranged in this order of description as seen from top to bottom in the vertical direction of the vehicle 10, and such that the first electric motor MG1, the driven shaft 30, the differential gear device 34 and the second electric motor MG2 are arranged in this order of description as seen from front to rear in the longitudinal direction of the vehicle 10.

Figure 3A:
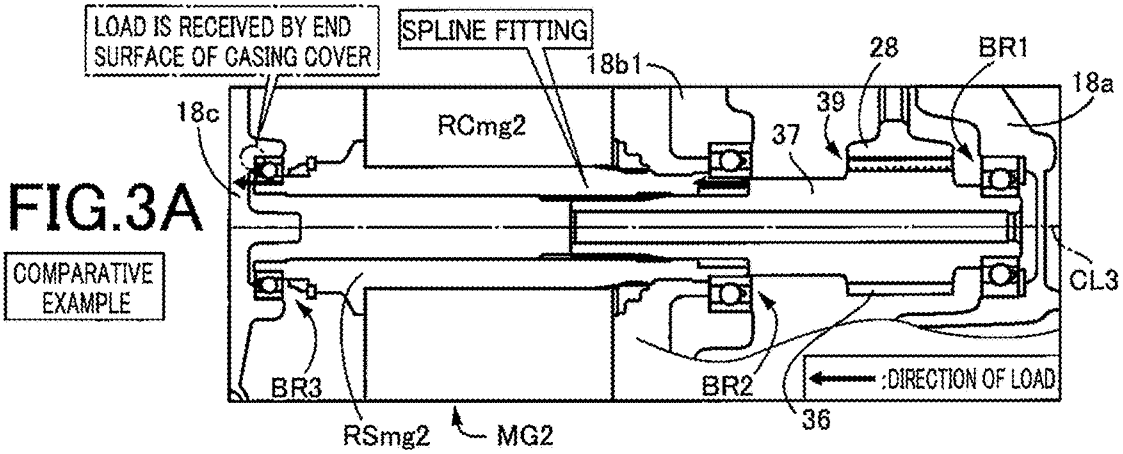
FIG. 3A is a cross-sectional view showing a structure in which a rotor shaft and a reduction shaft are held by a casing in a comparative example.
Figure 3B:
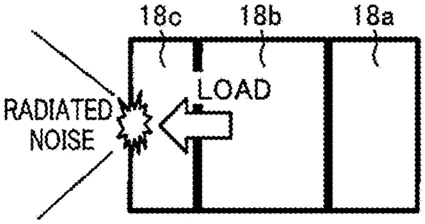
FIG. 3B is a view showing, by way of example, how a load is transmitted and how a radiated noise is transmitted in the comparative example shown in FIG. 3A.
Figure 3C:
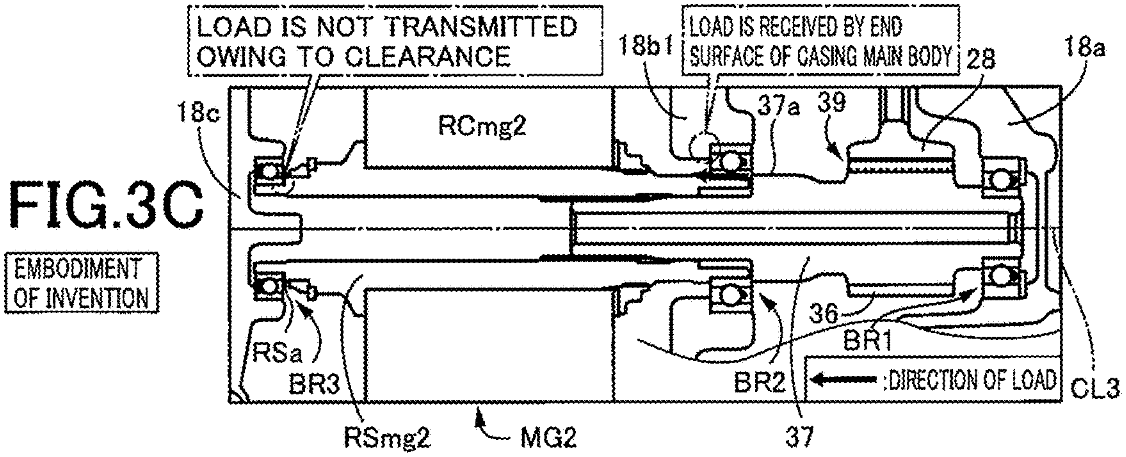
FIG. 3C is a cross-sectional view showing a structure in which the rotor shaft and the reduction shaft are held by the casing in an embodiment of the present invention.
Figure 3D:
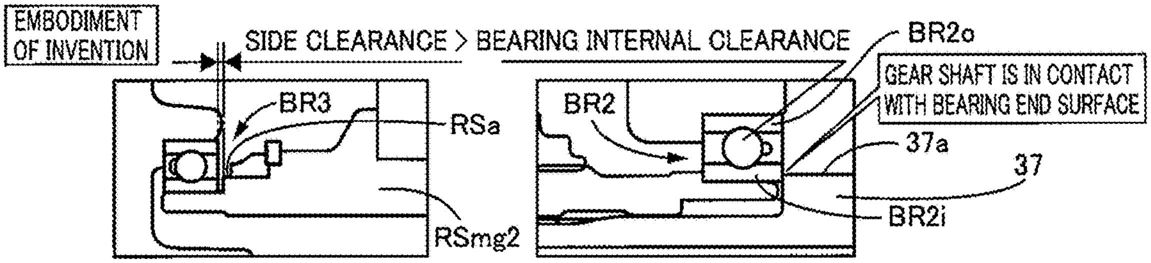
FIG. 3D is a set of cross-sectional views showing, in enlargement, parts of the view of FIG. 3C.
Figure 3E:
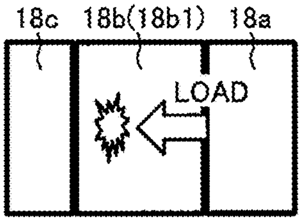
FIG. 3E is a view showing, by way of example, how a load is transmitted and how a radiated noise is transmitted in the embodiment shown in FIGS. 3C and 3D.

FIG. 3A is a cross-sectional view showing a structure in which the rotor shaft RSmg2 and the reduction shaft 37 are held by the casing 18 in a comparative example. FIG. 3B is a view showing, by way of example, how a thrust load is transmitted and how a radiated noise is transmitted in the comparative example shown in FIG. 3A. FIG. 3C is a cross-sectional view showing a structure in which the rotor shaft RSmg2 and the reduction shaft 37 are held by the casing 18 in the present embodiment of the invention. FIG. 3D is a set of cross-sectional views showing, in enlargement, parts of the view of FIG. 3C, wherein one of the views shows a periphery of a third bearing BR3, and the other of the views shows a periphery of a second bearing BR2. FIG. 3E is a view showing, by way of example, how a thrust load is transmitted and how a radiated noise is transmitted in the embodiment shown in FIGS. 3C and 3D.

As shown in FIGS. 3A to 3E, in the present embodiment as well as in the comparative example, the vehicle 10 includes a first bearing BR1 and the above-described second bearing BR2 and third bearing BR3 that are provided in the casing 18. The first bearing BR1 is a ball bearing through which an end portion of the reduction shaft 37 is rotatably held by the housing 18*a* of the casing 18, wherein the end portion of the reduction shaft 37 is opposite to the second electric motor MG2. The second bearing BR2 is a ball bearing through which an end portion of the rotor shaft RSmg2 is rotatably held by the main body 18*b* of the casing 18, particularly, by the partition wall 18*b*1, wherein the end portion of the rotor shaft RSmg2 is included in the above-described first-gear-side portion of the rotor shaft RSmg2 located on the side of the reduction gear 36. The third bearing BR3 is a ball bearing through which another end portion of the rotor shaft RSmg2 is rotatably held by the cover 18*c* of the casing 18, wherein the another end portion of the rotor shaft RSmg2 is opposite to the reduction gear 36.

In the structure in which the rotor shaft RSmg2 and the reduction shaft 37 are held by the casing 18 through the three bearings BR1, BR2, BR3 in three positions, in the comparative example shown in FIGS. 3A and 3B, the above-described thrust load (also referred to as a thrust force) generated by a gear meshing reaction in the helical gears 39 is transmitted to the rotor shaft RSmg2, and the rotor shaft RSmg2 may hit the cover 18*c* of the casing 18 through the third bearing BR3. In this case, since the cover 18*c* constitutes an outermost surface of the casing 18 and has a large surface area, the cover 18*c* is likely to serve as a noise generating portion, so that the radiated noise, which is generated by hitting of the rotor shaft RSmg2 to the cover 18*c*, is increased, thereby causing a risk of increase of NV.

In view of this, in the present embodiment shown in FIGS. 3C, 3D, 3E, the reduction shaft 37 includes a large diameter portion 37*a* which is located between the above-described motor-side portion of the reduction shaft 37 and which has a diameter larger than a diameter of the splined outer circumferential surface that is located in the motor-side portion of the reduction shaft 37. The rotor shaft RSmg2 includes a stepped portion RSa which is located adjacent to the above-described another end portion (on which the third bearing BR3 is disposed) of the rotor shaft RSmg2 and which has a diameter larger than a diameter of the another end portion of the rotor shaft RSmg2.

Further, the large diameter portion 37*a* of the reduction shaft 37 is in contact, at an end surface located thereof on the side of the second electric motor MG2, with an end surface of an inner race BR2*i* of the second bearing BR2 located on a side of the reduction gear 36. The above-described end portion of the rotor shaft RSmg2, which is included in the first-gear-side portion of the rotor shaft RSmg2, has an end surface that is opposed to the end surface of the large diameter portion 37*a* of the gear shaft 37, such that the end surface of the end portion of the rotor shaft RSmg2 is spaced apart from the end surface of the large diameter portion 37*a* of the gear shaft 37. The stepped portion RSa of the rotor shaft RSmg2 has an end surface opposed to the third bearing BR3. This end surface of the stepped portion RSa is spaced apart from an end surface of the third bearing BR3 opposed to this end surface of the stepped portion RSa, by a certain side clearance (also referred to as a gap), such that the clearance is larger than an internal clearance of the second bearing BR2. This internal clearance, i.e., an axial internal clearance, of the second bearing BR2 is a play or backlash between the inner race BR2*i* and an outer race BR20 of the second bearing BR2 in a direction parallel to the third axis CL3. When the thrust load is generated by the gear engagement reaction in the helical gears 39, the axial internal clearance of the second bearing BR2 is reduced before the clearance between the end surface of the stepped portion RSa and the end surface of the third bearing BR3 is reduced. Thus, the thrust load is transmitted from the reduction shaft 37 to the partition wall 18*b*1 of the main body 18*b* of the casing 18, so that the thrust load is received by the main body 18*b* of the casing 18. Since the partition wall 18*b*1 is located between the gear room Rg and the motor room Rm, the radiated noise can be suppressed. Since the cover 18*c* as the outermost surface of the casing 18 is not directly hit, the radiated noise is hardly transmitted.

As described above, in the present embodiment, the reduction shaft 37 includes the large diameter portion 37*a* which is located between the motor-side portion and the reduction gear 36 and which has the diameter larger than the diameter of the splined outer circumferential surface, and the large diameter portion 37*a* of the reduction shaft 37 is in contact, at the end surface thereof located on the side of the second electric motor MG2, with the end surface of the inner race BR2*i* of the second bearing BR2 located on the side of the reduction gear 36. In addition, the stepped portion Rsa has the end surface opposed to the third bearing, and the end surface of the stepped portion Rsa is spaced apart from the end surface of the third bearing opposed to the end surface of the stepped portion Rsa, by the clearance that is larger than the internal clearance of the second bearing BR2. Thus, when the thrust force acting on the reduction shaft 37 in the direction toward the second electric motor MG2 is generated by the gear meshing reaction force in the helical gears 39, the thrust force is applied to the inner race BR2*i* of the second bearing BR2. In this instance, the internal clearance of the second bearing BR2, i.e., the play or backlash between the inner race BR2*i* and the outer race BR20 of the second bearing BR2 is reduced before the clearance between the end surface of the stepped portion Rsa and the end surface of the third bearing BR3 is reduced. Therefore, the thrust force acting on the reduction shaft 37 in the direction toward the second electric motor MG2 is transmitted to the partition wall 18*b*1 through the second bearing BR2, and is received by the partition wall 18*b*1, without easily being transmitted to the cover 18*c*, so that the cover 18*c* is not easily made to serve as the noise generating portion. Since the partition wall 18*b*1 is located between the gear room Rg and the motor room Rm, even if the thrust force is transmitted to the partition wall 18*b*1, the noise radiated to outside of the casing 18 is suppressed. Therefore, the NV can be suppressed.

Although the embodiment of the present invention has been described in detail with reference to the drawings, the above description is merely an embodiment, and the present invention can be implemented in various modified and improved forms based on the knowledge of those skilled in the art.

NOMENCLATURE OF ELEMENTS

10: electric vehicle
18: casing
18*a*: housing (first casing member)
18*b*: main body (second casing member)
18*b*1: partition wall (second casing member)
18*c*: cover (third casing member)
28: driven gear (second gear)
36: reduction gear (first gear)
37: reduction shaft (gear shaft)
37*a*: large diameter portion
39: helical gears
BR1: first bearing
BR2: second bearing
BR2*i*: inner race
BR3: third bearing
CL2: second axis (another rotation axis parallel to rotation axis of electric motor)
CL3: third axis (rotation axis of electric motor)
MG2: second electric motor (electric motor)
RSmg2: rotor shaft (rotor shaft of electric motor)
RSa: stepped portion
Rg: gear room
Rm: motor room

What is claimed is:

1. An electric vehicle comprising:
an electric motor having a rotor shaft;
helical gears including a first gear disposed on a rotation axis of the electric motor and a second gear disposed on another rotation axis that is parallel to the rotation axis of the electric motor, such that the first and second gears mesh with each other;
a gear shaft on which the first gear is fixed in a relatively non-rotatable manner, such that the gear shaft has, in a motor-side portion thereof located on a side of the electric motor, a splined outer circumferential surface that is fitted in a splined inner circumferential surface of a first-gear-side portion of the rotor shaft located on a side of the first gear;
a casing including a first casing member, a second casing member and a third casing member, such that the first casing member and the second casing member are fixed to each other to form a gear room that houses the helical gears, and such that the second casing member and the third casing member are fixed to each other to form a motor room that houses the electric motor;

a first bearing through which an end portion of the gear shaft is rotatably held by the first casing member, the end portion of the gear shaft being opposite to the electric motor;

a second bearing through which an end portion of the rotor shaft is rotatably held by the second casing member, the end portion of the rotor shaft being included in the first-gear-side portion of the rotor shaft; and a third bearing through which another end portion of the rotor shaft is rotatably held by the third casing member, the another end portion of the rotor shaft being opposite to the first gear, wherein the gear shaft includes a large diameter portion which is located between the motor-side portion and the first gear and which has a diameter larger than a diameter of the splined outer circumferential surface, wherein the rotor shaft includes a stepped portion which is located adjacent to the another end portion of the rotor shaft and which has a diameter larger than a diameter of the another end portion of the rotor shaft, wherein the large diameter portion of the gear shaft is in contact, at an end surface thereof located on the side of the electric motor, with an end surface of an inner race of the second bearing located on a side of the first gear, and wherein the stepped portion has an end surface opposed to the third bearing, the end surface of the stepped portion being spaced apart from an end surface of the third bearing opposed to the end surface of the stepped portion, by a clearance that is larger than an internal clearance of the second bearing.

2. The electric vehicle according to claim 1, wherein the end portion of the rotor shaft, which is included in the first-gear-side portion of the rotor shaft, has an end surface that is opposed to the end surface of the large diameter portion of the gear shaft, such that the end surface of the end portion of the rotor shaft is spaced apart from the end surface of the large diameter portion of the gear shaft.

3. The electric vehicle according to claim 1, wherein the third casing member, by which the another end portion of the rotor shaft is rotatably held through the third bearing, constitutes an outermost surface of the casing.

* * * * *